United States Patent [19]

Doble

[11] Patent Number: 4,815,939

[45] Date of Patent: Mar. 28, 1989

[54] TWISTED HOLLOW AIRFOIL WITH NON-TWISTED INTERNAL SUPPORT RIBS

[75] Inventor: Gordon S. Doble, Shaker Heights, Ohio

[73] Assignee: Airfoil Textron Inc., Lima, Ohio

[21] Appl. No.: 926,152

[22] Filed: Nov. 3, 1986

[51] Int. Cl.[4] ............................ B64C 3/18; B21K 3/04
[52] U.S. Cl. ............................... 416/233; 29/156.8 H; 244/123
[58] Field of Search .................. 244/123, 35 R, 45 R, 244/131; 416/223 R, 226, 233, 238; 29/156.8 R, 156.8 H

[56] References Cited

U.S. PATENT DOCUMENTS

| | | | |
|---|---|---|---|
| 1,786,307 | 12/1930 | Kreigh | 244/35 R |
| 1,818,519 | 8/1931 | Young | 244/35 R |
| 2,210,642 | 8/1940 | Thompson | 244/35 R |
| 3,736,638 | 6/1973 | Stone, Jr. | 416/233 |
| 4,089,456 | 5/1978 | Toppen et al. | 29/156.8 H |
| 4,501,053 | 2/1985 | Craig et al. | 29/156.8 H |
| 4,512,069 | 4/1985 | Hagemeister | 29/156.8 H |
| 4,643,646 | 2/1987 | Hahn et al. | 416/226 |

Primary Examiner—Galen Barefoot
Attorney, Agent, or Firm—Edward J. Timmer

[57] ABSTRACT

A transversely twisted hollow airfoil member is provided by diffusion bonding together airfoil components each having a skin or shell in the form of a partial airfoil twisted transversely along its length and one or more internal support ribs having bonding surfaces which are not twisted transversely along their length. Each support rib extends substantially normal to a bonding plane defined by bonding surfaces on the support ribs. As a result of the rib and bonding surface orientation, the airfoil components can be forged and the components bonded together at elevated temperature in short times between dies movable by high pressure toward one another normal to the bonding surfaces.

20 Claims, 3 Drawing Sheets

NEAR TIP    NEAR ROOT

PRIOR ART

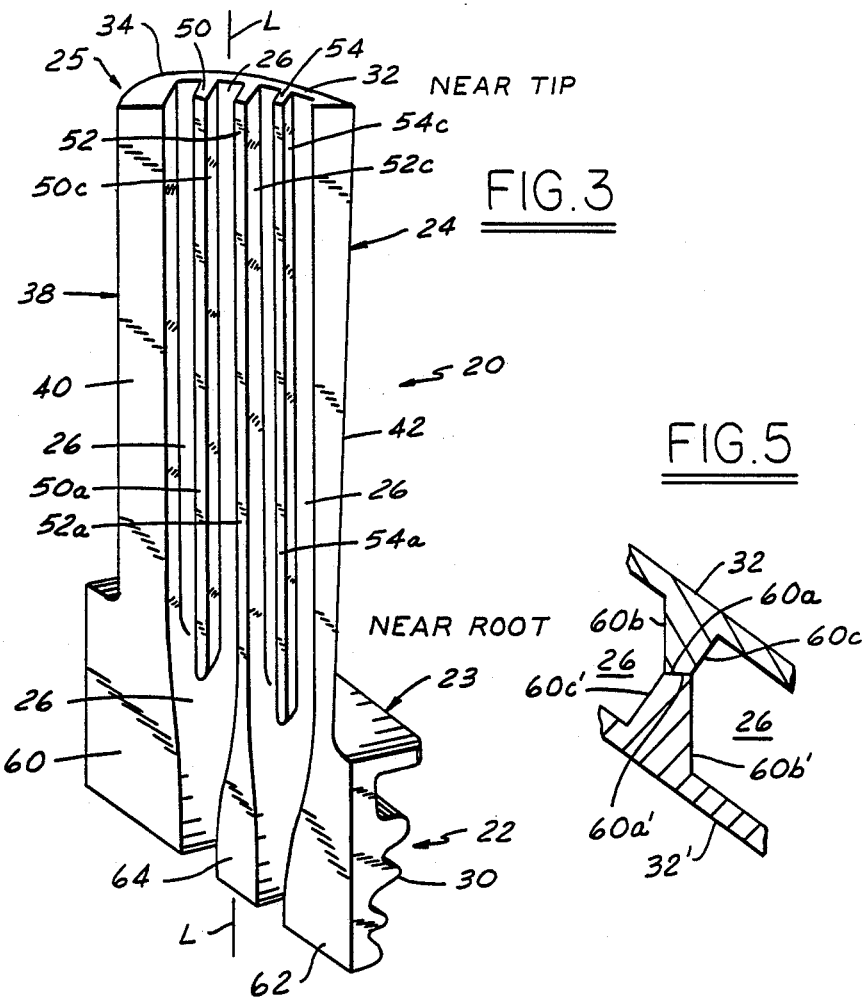
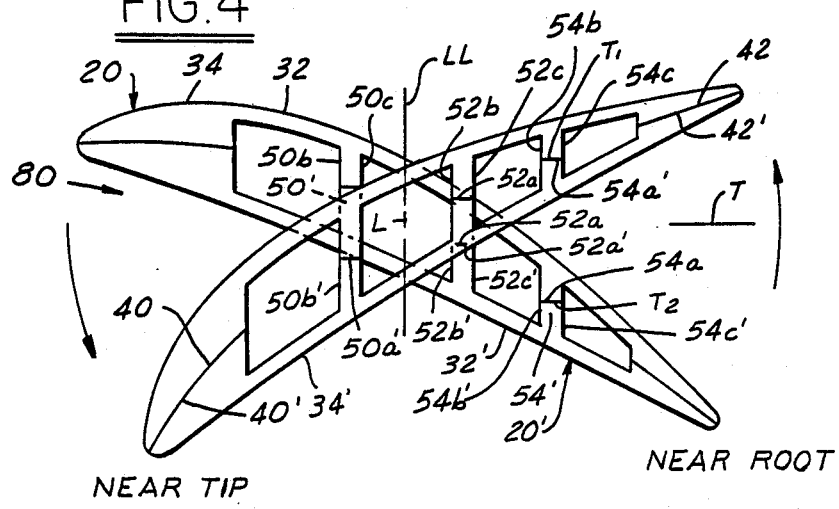

TWISTED HOLLOW AIRFOIL WITH NON-TWISTED INTERNAL SUPPORT RIBS

FIELD OF THE INVENTION

The invention relates to split, bonded hollow airfoil structures and to methods for their manufacture, especially by forging and diffusion bonding.

BACKGROUND OF THE INVENTION

In the past, airfoils such as blades and vanes, for gas turbine engines have been manufactured in longitudinally split halves with the halves diffusion bonded together to form a hollow airfoil. In this technique, each half of the airfoil typically includes one or more support ribs which in the bonded airfoil are bonded internally to another opposed rib from the other half of the airfoil or to the inner side of the other airfoil half. Spaces between the ribs provide internal passages for cooling fluid such as compressor discharge cooling air flow.

In the past, the support ribs have extended from the airfoil forming skin of the airfoil halves 3, 3' substantially normal or perpendicular thereto; e.g., as shown in FIGS. 1 and 2 where internal support ribs 1, 1' are shown extending substantially normal to the airfoil-forming skins 2, 2' of the respective airfoil halves 3, 3' along the length of the ribs from adjacent the root 4 toward the tip 5 of the airfoil. It is apparent from FIGS. 1 and 2 that the airfoil of each half is highly twisted transversely along its longitudinal axis from adjacent the root 4 toward the tip 5.

As a result of the high transverse twist from root to tip of the airfoil and the orientation of the support ribs 1, 1' substantially normal to the skins 2, 2', the support ribs 1, 1', including their bonding surfaces 1a, 1a', twist or spiral transversely from the root toward the tip and complicate the bonding process to join airfoil halves 3 and 3' at the bonding surfaces provided on the ribs. In particular, due to the high twist of the support ribs, the bonding dies receiving the mated airfoil halves will require a very close fit between mating die parts to maintain accurate bonding alignment between the rib bonding surfaces and very low bonding loads or forces must be used to press the dies and airfoil halves together to prevent deformation of the rib bonding surfaces 1a 1a' which are not normal to the direction of the bonding pressure. As a result of the low bonding pressures capable of being applied, longer bonding times are required to diffusion bond the airfoil halves together; e.g., typical bonding times could be 4-6 hours with airfoil components having transversely twisted ribs.

Another disadvantage of the prior art technique described with the support ribs substantially normal to the airfoil skin and twisted transversely along their lengths is that the airfoil halves are not amenable to being forged to near net shape as a result of the high transverse twist of the support ribs in the longitudinal direction along the airfoil, although such airfoil halves have been cast or machined in the past by well known methods.

What is needed is an airfoil structure amenable to fabrication in halves or split parts by forging and bondable together in relative short times.

Prior art patents illustrating a twisted airfoil having internal support ribs extending substantially normal to the airfoil skin and thus having highly transversely twisted support ribs are U.S. Pat. No. 4,512,069 issued Apr. 23, 1985, to K. Hagomeister and U.S. Pat. No. 4,501,053 issued Feb. 26, 1985 to H. Craig.

SUMMARY OF THE INVENTION

The invention contemplates an airfoil component or half having a skin or shell configured in the form of a partial airfoil twisted transversely along its longitudinal axis and having one or more support ribs extending from the skin with each rib terminating in a bonding surface that is not transversely twisted along its longitudinal axis such that axes normal to the bonding surface along its length are substantially parallel to one another when viewed along the longitudinal axis or direction of the airfoil.

The invention further contemplates an airfoil component of the type described in the preceding paragraph wherein each support rib substantially along its length extends from the skin in other than a normal orientation and instead extends normal to a bonding plane defined by the bonding surface of the rib or ribs. Such an airfoil component can be forged at relatively low cost.

The invention further contemplates an airfoil member comprising a pair of the airfoil components of either of the preceding paragraphs bonded together at the bonding surfaces to provide a twisted hollow airfoil member with one or more non-twisted internal support ribs between the skins.

The invention still further contemplates a method for making the airfoil member of the preceding paragraph including forming a pair of airfoil components of preceding paragraphs, preferably by forging, and bonding the components together between dies that move toward one another under bonding pressure in a direction substantially normal to the bonding surfaces of the non-twisted airfoil support ribs. As a result of the bonding pressure applied substantially normal to the bonding surfaces of the ribs, high pressure diffusion bonding can be practiced, resulting in relatively rapid bonding times, typically bonding times of about 15 minutes.

These and other objects and advantages of the invention will become apparent to those skilled in the art with reference to the following drawings and detailed description of preferred embodiments.

BRIEF DESCRIPTION OF THE DRAWINGS

FIG. 3 is a view similar to FIG. 1 for a transversely twisted hollow airfoil component of this invention.

FIG. 4 is a multiple lateral cross-sectional view through the bonded airfoil member of this invention showing a near root section of the airfoil below a superimposed near tip section.

FIG. 5 is a partial cross-sectional view of another embodiment of a support rib of the invention.

DESCRIPTION OF PREFERRED EMBODIMENTS

Figure 1:
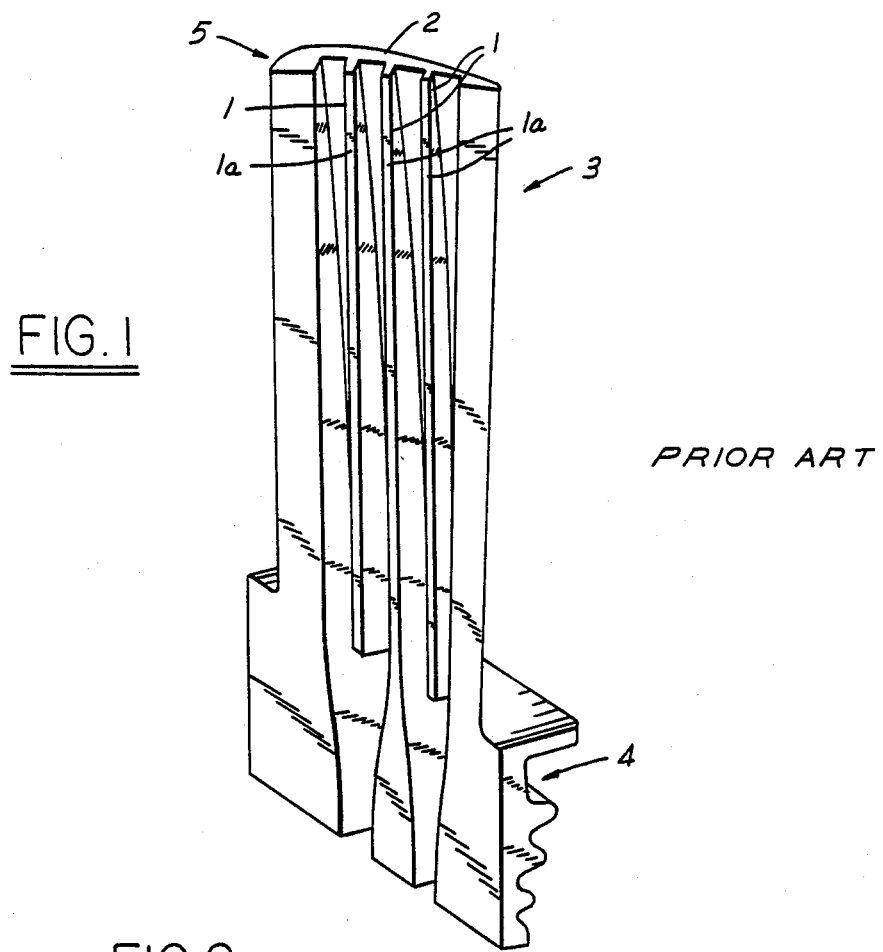
FIG. 1 is a perspective view of a prior art transversely twisted airfoil half or component.
Figure 2:
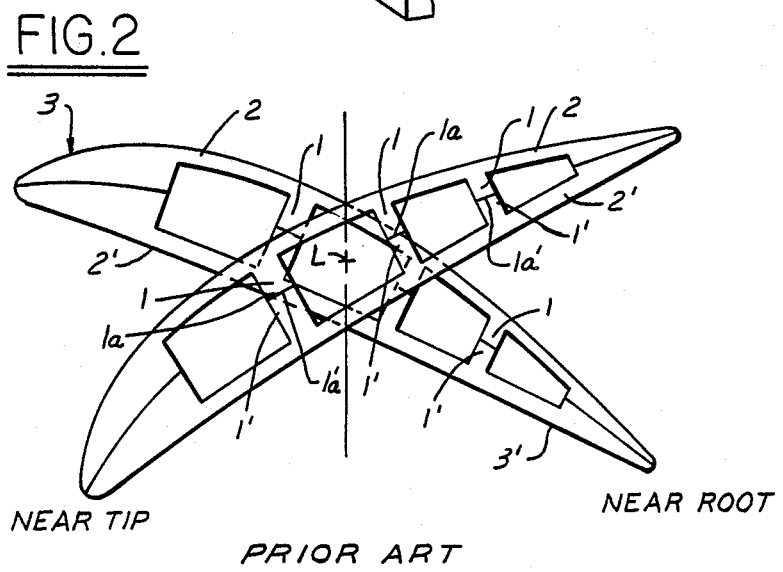
FIG. 2 is a multiple lateral cross-sectional view through a prior art transversely twisted hollow bonded airfoil showing a near root section of the airfoil below a superimposed near tip section. A lateral cross-section as used herein is one that intersects the longitudinal axis L of the airfoil section.

FIG. 3 illustrates an airfoil component 20, such as a blade half or vane half, made in accordance with the present invention.

As shown, the airfoil component 20 includes a root section 22, platform section 23 and airfoil section 24 terminating in tip 25. The airfoil component comprises a half of the ultimate airfoil member 80 to be produced, see FIGS. 4 and 7.

The airfoil component 20 includes longitudinally extending channels 26 extending from the root section to the tip section which may, if desired, form longitudinal cooling passages 27 in the bonded airfoil member for conducting cooling fluid such as air flow therethrough. Or, passages 27 may simply be used to reduce weight of the airfoil member 80.

The root section 22 includes a "fir tree" portion 30 for receipt in a complementary "fir tree" slot in a disc or hub (not shown) as is well known. Typically, the root section 22 in the as-forged condition is oversized and final machining thereof to finished tolerance is conducted after the airfoil member 80 is formed by bonding components 20, 20' together.

The airfoil section 24 includes a skin on shell 32 configured as half of an airfoil form twisted transversely along the longitudinal axis L of the airfoil section (also known as the centerline or stacking line of the airfoil). The transverse twist along the length of the airfoil is especially clear from FIG. 4 for the bonded airfoil member 80 where a cross-section of the airfoil section near and above root section 22 is shown with a cross-section of the airfoil section near the tip 25 superimposed thereover. The direction of the transverse twist is indicated by the arrows on FIG. 4.

The skin or shell 32 includes outer partial airfoil surface 34 that together with the outer airfoil surface 34' on mating airfoil component 20' define the total airfoil for the glade or vane.

The skin or shell 32 includes on the inner side 38 leading edge or peripheral bonding surface 40 and trailing edge or peripheral bonding surface 42 which are twisted transversely along the longitudinal axis L of the airfoil, FIG. 4, and which ultimately are bonded to similar leading and trailing edge bonding surfaces 40', 42', respectively, on the mating airfoil component 20'. Between the leading and trailing bonding surfaces 40, 42 are the longitudinally extending internal support ribs 50, 52, 54 which are spaced apart chord-wise of the airfoil to form the fluid channels 26 therebetween. As discussed hereinbelow, the support ribs 50, 52, 54 do not twist transversely along their longitudinal axis or length as the partial airfoil skin 32 and leading and trailing bonding surfaces 40, 42 do.

Root section 22 includes leading and trailing bonding surfaces 60, 62 and intermediate bonding surface 64 for bonding and mating to similar complementary surfaces on the root section 22' of the other airfoil component 20'. Bonding surfaces 60, 62, 64 on root section 22 and those on the mating root section 22' may be transversely twisted.

As mentioned hereinabove, the suppport ribs 50, 52, 54 of the airfoil component 20 do not twist transversely along and about the longitudinal axis L of the airfoil. This non-twist is best seen in FIG. 4.

As shown in FIG. 4, it is apparent that each rib 50, 52, 54 extends laterally from inner side 38 of the skin 32 substantially along its length between the root and tip at other than a normal or perpendicular relation to the skin 32 or a tangent to the skin at areas of intersection. One exception to this is a lateral plane or cross-section along the length of each rib that (the plane) includes a tangent line to the airfoil skin which tangent line is parallel to the respective rib bonding plane. At this lateral plane along the rib length, each rib will extend substantially normal to the airfoil skin 32. Typically, the lateral plane where each rib will be substantially normal to the skin will be approximately at the center or mid-point of the length of each rib. As used hereinabove and hereinafter including the claims, each rib is referred to as extending at other than a normal orientation or relation to the skin substantially along the rib length with "substantially" used to account for this exception at the lateral plane.

When viewed at any given lateral cross-section through the airfoil as in FIG. 4, each support rib extends substantially along its length substantially normal or perpendicular to a bonding plane defined by each of the bonding surfaces 50a, 52a, 54a, respectively, in which each rib terminates. This is in contrast to the prior art practice of having the support ribs extend from the skin substantially normal or perpendicular to the skin.

Furthermore, it is clear from FIG. 4 that each bonding surface 50a, 52a, 54a is also not twisted transversely along its length or longitudinal axis such that axes normal to each bonding surface are substantially parallel to one another when viewed along the longitudinal axis or direction of the airfoil and to the same given longitudinal plane LL through the airfoil. In other words, for any given lateral cross-section through the airfoil section 24 intersecting longitudinal axis L along its length, the bonding surface of each rib lies in respective transverse planes $T_1$, $T_2$ that are substantially parallel with one another when viewed transversely from the leading edge toward the trailing edge and vice versa and with the same transverse plane T. The same is true for each rib 50, 52, 54. And, it is clear that at any given lateral cross-section, the bonding surfaces of each rib 50, 52, 54 are in transverse planes that are substantially parallel with one another and the same transverse plane T.

FIG. 4 shows that the sidewalls 50b, 50c, 52b, 52c and 54b, 54c defining each rib are substantially parallel with one another along the length of the rib and are substantially normal to the respective bonding surface 50a, 52a, 54a. The sidewalls are referred to as substantially parallel with one another and substantially normal to the bonding plane since in fact each sidewall will be slightly relieved or tapered as it extends from the skin in a manner and extent sufficient to allow release of the forging die therefrom.

As shown in FIG. 4, the support ribs 50', 52', 54' of airfoil component 20' are like those of airfoil component 20 described hereinabove with like features bearing like reference numerals primed. Of course, airfoil skin 32' of airfoil component 20' is suitably configured to form the desired overall airfoil shape for the airfoil member, such as a blade or vane, when the airfoil components 20, 20' are bonded together. Those skilled in the art will select the desired overall airfoil shape or contour depending on individual gas turbine engine designs.

An alternative version for each support rib is shown in FIG. 5 where it can be seen that one sidewall 60b is perpendicular to bonding surface 60a while the other sidewall 60c is inclined at an angle to the bonding surface 60a to provide additional rib thickness at the base adjacent the skin 32 for further support, strength and rigidity at the juncture of the rib with the skin. The bonding surface 60a in this embodiment is like those described hereinabove in that it is not transversely twisted along the longitudinal axis.

A significant advantage of airfoil components 20, 20' made in accordance with the invention is that each airfoil component can be forged from suitable metals or alloys; e.g., titanium, titanium alloys, nickel or cobalt base superalloys or others, with the internal support ribs shown by known techniques to near net shape or shapes requiring a minimum of stock removal by machining. As forged airfoil components 20, 20' can thus be produced on a relatively low cost basis compared to complete machining thereof, for example, with intricate or close tolerance and easily inspected internal details, e.g., cooling passages 26, since the inner side 38 is available for working by forging and inspection.

The highly transversely twisted airfoil component having highly transversely twisted support ribs as shown in FIG. 1 cannot be produced by forging as a result of the transverse twist on the support ribs.

By having the support ribs 50, 52, 54 extend substantially normal to the bonding plane substantially along their lengths instead of normal to skin 32, the present invention imparts forgeability to the airfoil components 20, 20', not previously available.

Figure 6:
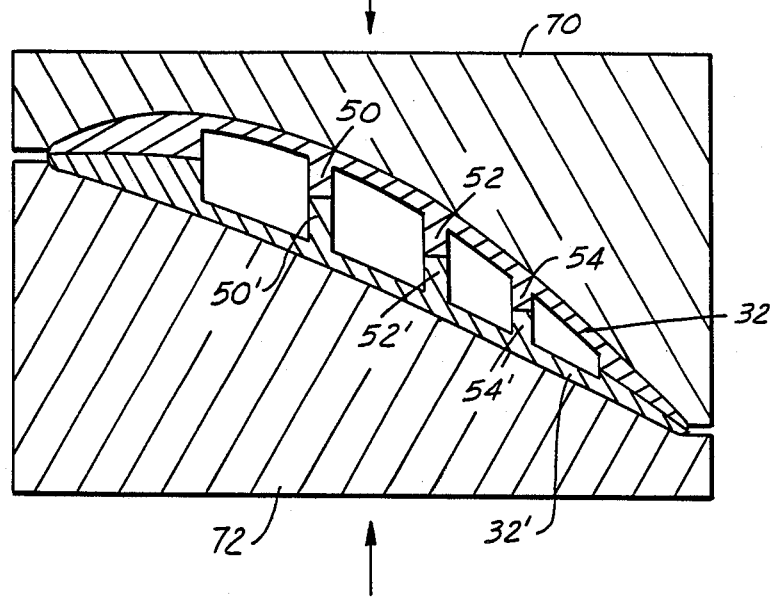
FIG. 6 is a somewhat schematic cross-section of mated airfoil components of the invention between female dies for diffusion bonding.
Figure 7:
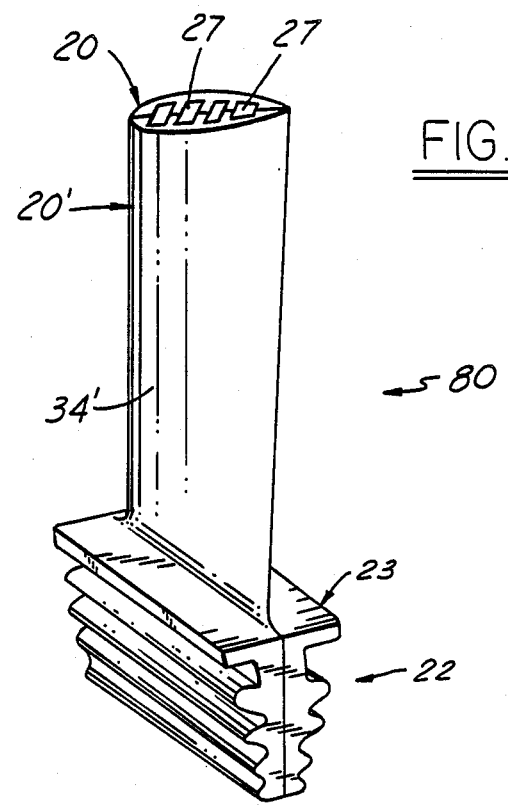
FIG. 7 is a perspective view of the bonded airfoil member.

The bonded airfoil member 80 of FIG. 7 is produced by diffusion bonding airfoil components 20, 20' together at the various bonding surfaces described hereinabove on the root section 22 and airfoil section 24 under high temperature and pressure. The airfoil components 20, 20' are placed between female dies 70, 72 made of a "hard" material such as nickel base superalloy or molybdenum that do not plastically deform at the particular bonding temperature and pressure involved, FIG. 6. Of course, the various bonding surfaces on airfoil components 20, 20' are aligned and abutted as shown in FIG. 6 during such metallurgical bonding. The female dies 70, 72 can be loaded or forced together in a hydraulic press or other force applying device to apply bonding pressure across the various bonding surfaces in a single direction although in opposite senses; i.e., substantially normal to bonding surfaces 50a, 50a'; 52a, 52a' and 54a, 54a', FIG. 6. High bonding pressure can be applied since it is normal to those rib bonding surfaces. In this way, bonding time can be relatively short, e.g., about 15 minutes, compared to the longer times, e.g., 4–6 hours, required in the prior art method where lower bonding pressure must be used when the ribs are transversely twisted along their lengths. Of course, the particular diffusion bonding pressure and bonding temperature required will depend on the alloy or material from which airfoil components 20, 20' are forged. Conventional heating devices such as resistance elements, induction or external furnaces can be used to heat the dies and airfoil components for bonding. Other bonding processes may be used as well including, but not limited to, transient liquid phase bonding.

And, it will be apparent that the number and spacing of internal support ribs used will depend on the particular hollow airfoil member to be made.

While certain preferred embodiments of the invention have been described in detail above, those familiar with the art will recognize that various modifications and changes can be made therein for practicing the invention as defined by the following claims.

I claim:

1. A blade or vane component for joining to another respective blade or vane component for use in a gas turbine engine, said blade or vane component having a partial root portion and partial tip portion and having a skin in the form of a partial airfoil twisted transversely along its longitudinal axis between said partial root portion and tip portion and having at least one support rib integral with the skin, said support rib extending from the skin and terminating in a bonding surface that is not twisted transversely along the longitudinal axis such that axes normal to the bonding surface along its length between said partial root portion and tip portion are substantially parallel with one another when viewed along the longitudinal axis of the airfoil at the same given transverse position on the bonding surface.

2. The blade or vane component of claim 1 wherein said at least one support rib extends at other than a normal orientation relative to the skin substantially along the rib length.

3. The blade or vane component of claim 1 wherein said at least one rib includes at least one sidewall extending from the skin at other than a normal orientation thereto substantially along the length of the rib sidewall and at a substantially normal orientation relative to the bonding surface.

4. The blade or vane component of claim 1 which is forged.

5. A blade or vane component for joining to another respective blade or vane component for use in a gas turbine engine, said blade or vane component having a partial root portion and partial tip portion and having a skin in the form of a partial airfoil twisted transversely along its longitudinal axis between said partial root portion and tip portion and having at least one support rib integral with the skin and terminating in a bonding surface defining a bonding plane, said support rib extending from the skin at other than a normal orientation to the skin substantially along the length of the support rib between said partial root portion and tip portion and at a substantially normal orientation to the bonding plane.

6. A blade or vane for a gas turbine engine, said blade or vane having a root portion and tip portion and having an airfoil twisted transversely along its longitudinal axis between said root portion and tip portion and having a first outer skin, second outer skin and at least one support rib integral with one of said first outer skin or second outer skin and extending between the first and second outer skins and along said longitudinal axis, said at least one support rib having bonded surfaces between the first and second outer skins that are not twisted transversely along the longitudinal axis such that axes normal to the bonded surfaces along its length between said root portion and tip portion are substantially parallel with one another when viewed along said longitudinal axis of the airfoil at the same given transverse position on the bonded surfaces.

7. The blade or vane of claim 6 wherein said at least a first rib comprises one rib extending integrally from the first skin and a second opposing rib extending integrally from the second skin.

8. The blade or vane of claim 7 wherein the first skin and associated rib and second skin and associated rib are forged.

9. A blade or vane for a gas turbine engine, said blade or vane being twisted transversely about its longitudinal axis between a root portion and tip portion and having a first outer skin, second outer skin and at least one support rib between the first outer skin and second outer skin and integral with one of said first outer skin or second outer skin, said support rib having mating opposed bonded surfaces defining a bonding plane, said support rib extending between the first outer skin and second outer skin at other than a normal orientation thereto substantially along said length of the support rib between said root portion and tip portion and at a substantially normal orientation to the bonding plane.

10. The blade or vane of claim 9 wherein said at least a first rib comprises one rib extending integrally from the first skin and a second opposing rib extending integrally from the second skin.

11. The blade or vane of claim 10 wherein the first skin and associated rib and second skin and associated rib are forged.

12. In a method for making a blade or vane for a gas turbine engine by bonding first and second outer skins together to form an airfoil twisted transversely along its longitudinal axis between a root portion and tip portion with opposed mating surfaces of an internal support rib between the first and second outer skins bonded together, the improvement comprising forming the internal support rib to extend at other than a normal orientation to the first and second outer skins substantially along the length of the support rib between said root portion and tip portion and substantially normal to the mating surfaces, mating the first and second outer skins with the mating surfaces abutted and applying bonding pressure across the mating surfaces in a direction substantially normal thereto at a given transverse position on the mating surfaces to force them together while heating the first and second outer skins and support rib to effect bonding between the mating surfaces.

13. The method of claim 12 wherein a portion of the internal support rib is formed on the first skin and another portion is formed on the second skin such that said portion and said another portion are in opposition when the first and second skins outer are mated.

14. The method of claim 12 wherein said portion of the support rib on the first skin is forged thereon.

15. The method of claim 14 wherein said another portion on the second skin is forged thereon.

16. The method of claim 12 wherein the bonding pressure and temperature are sufficient to diffusion bond the mating surfaces.

17. A blade or vane component for joining to another respective blade or vane component for use in a gas turbine engine, said blade or vane component having a partial root portion and partial tip portion and having a skin in the form of a partial airfoil twisted transversely along its longitudinal axis between said partial root portion and tip portion and having at least one support rib integral with the skin and extending from the skin, said support rib terminating in a bonding surface that is not twisted transversely along the longitudinal axis between said partial root portion and tip portion.

18. The blade or vane component of claim 17 wherein said at least one support rib extends at other than a normal orientation relative to the skin substantially along the rib length.

19. The blade or vane component of claim 17 wherein said at least one rib includes at least one sidewall extending from the skin at other than a normal orientation thereto substantially along the length of the rib sidewall and at a substantially normal orientation relative to the bonding surface.

20. The blade or vane component of claim 17 which is forged.

* * * * *

UNITED STATES PATENT AND TRADEMARK OFFICE
CERTIFICATE OF CORRECTION

PATENT NO. : 4,815,939

DATED : March 28, 1989

INVENTOR(S) : Gordon S. Doble

It is certified that error appears in the above-identified patent and that said Letters Patent is hereby corrected as shown below:

In the specification:

Column 1, line 46, after "1a" insert --,--.
Column 6, line 58, delete "a first rib comprises one" and insert --one rib comprises a first--.
Column 7, line 11, delete "a first rib comprises one" and insert --one rib comprises a first--.
Column 8, line 5, before "skins" insert --outer-- and after "skins" delete "outer".

Signed and Sealed this

Twentieth Day of November, 1990

*Attest:*

HARRY F. MANBECK, JR.

*Attesting Officer*     Commissioner of Patents and Trademarks